Figure 2:
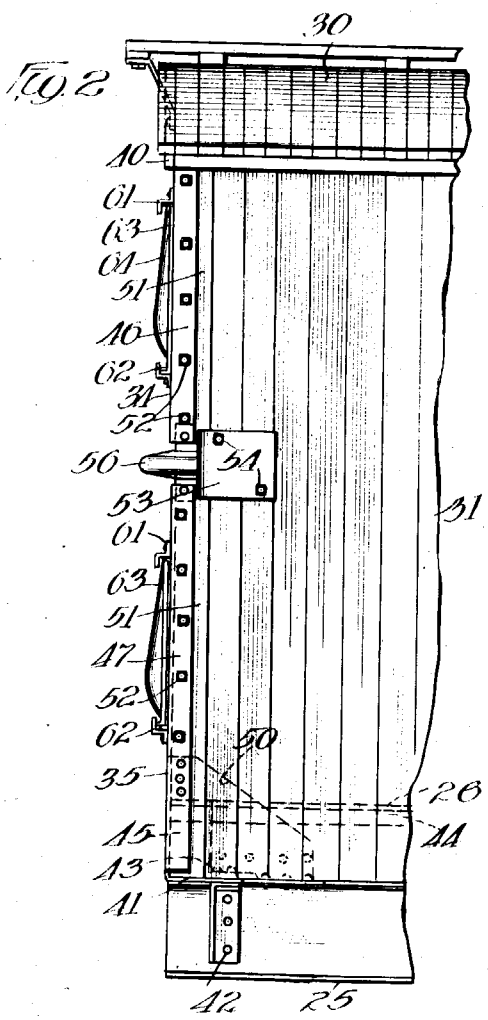

V. E. SISSON.

METAL END FOR RAILWAY CARS.

APPLICATION FILED JAN. 17, 1918.

Reissued Feb. 19, 1918.

14,434.

4 SHEETS—SHEET 1.

Witnesses:

Harry E. Corbit

W. F. Kilroy

Inventor:

Vinton E. Sisson

By Barnett & Pillsbury Atty.

V. E. SISSON.
METAL END FOR RAILWAY CARS.
APPLICATION FILED JAN. 17, 1918.
Reissued Feb. 19, 1918.
14,434.
4 SHEETS—SHEET 2.
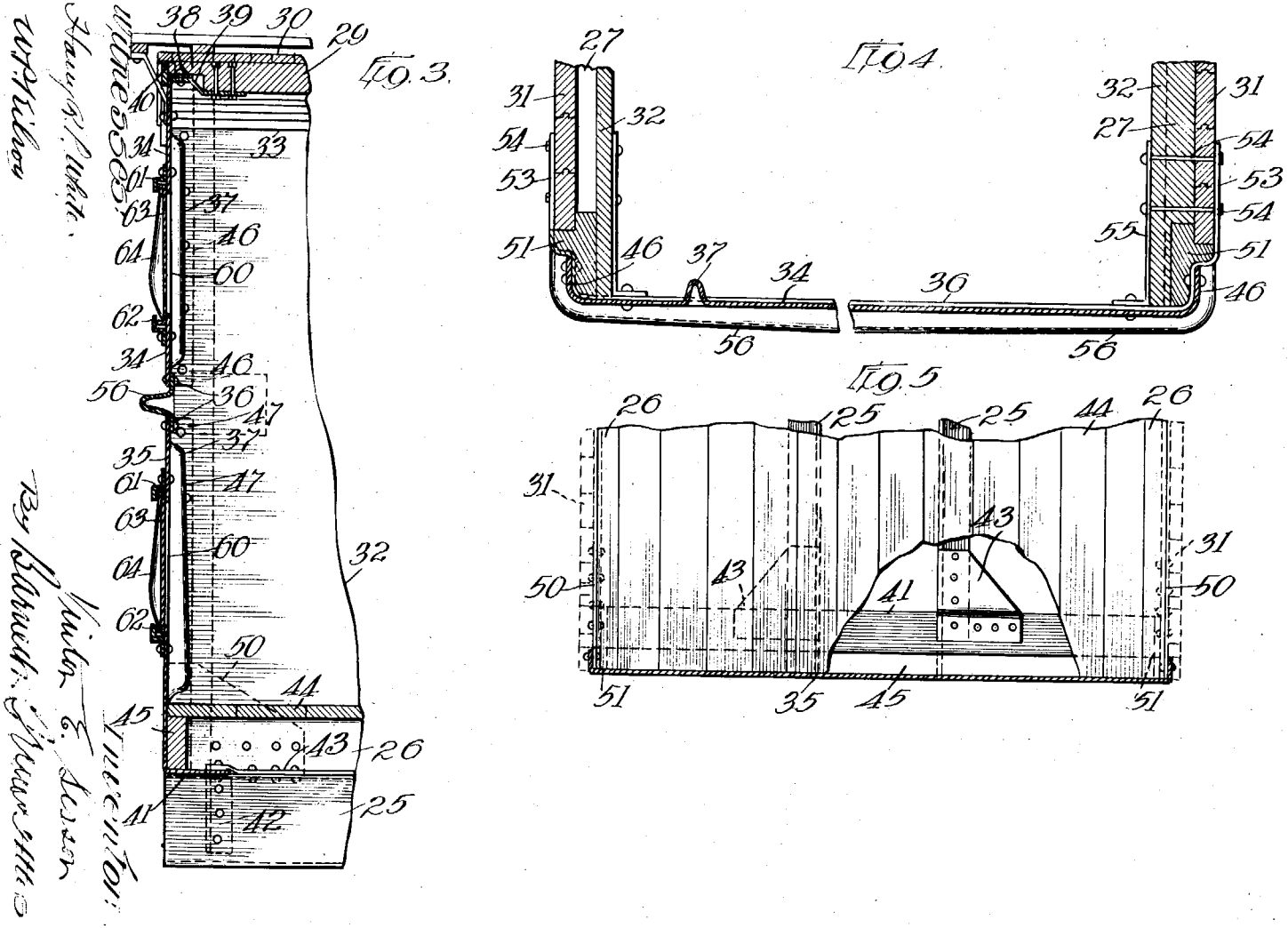

V. E. SISSON.
METAL END FOR RAILWAY CARS.
APPLICATION FILED JAN. 17, 1918.
Reissued Feb. 19, 1918.
14,434.
4 SHEETS—SHEET 3.
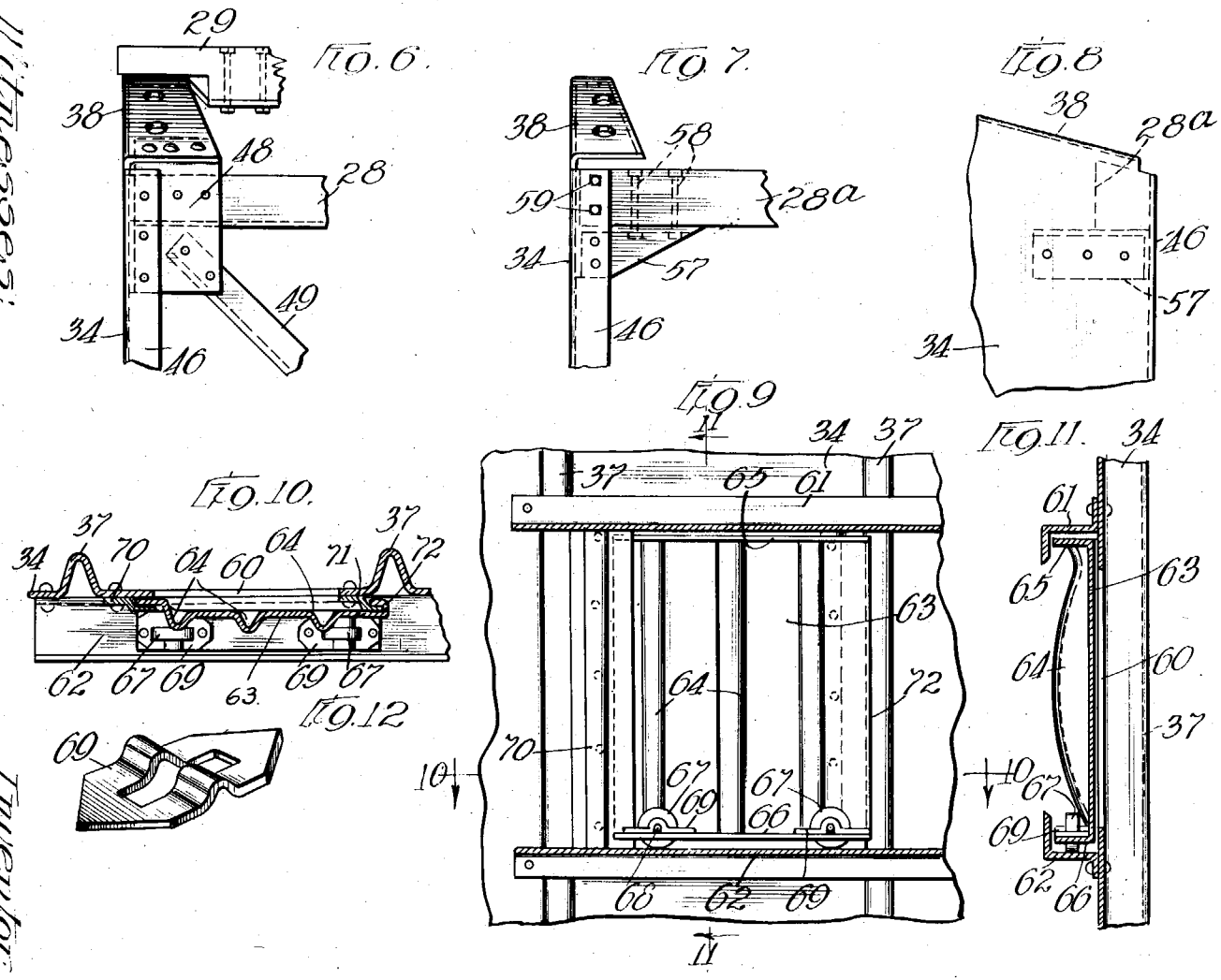
Witnesses:
Harry E. L. White
W. P. Kilroy
Inventor:
Vivian E. Sisson
By Barnett, Brown & Wills V. E. SISSON.
METAL END FOR RAILWAY CARS.
APPLICATION FILED JAN. 17, 1918.
Reissued Feb. 19, 1918.
14,434.
4 SHEETS—SHEET 4.
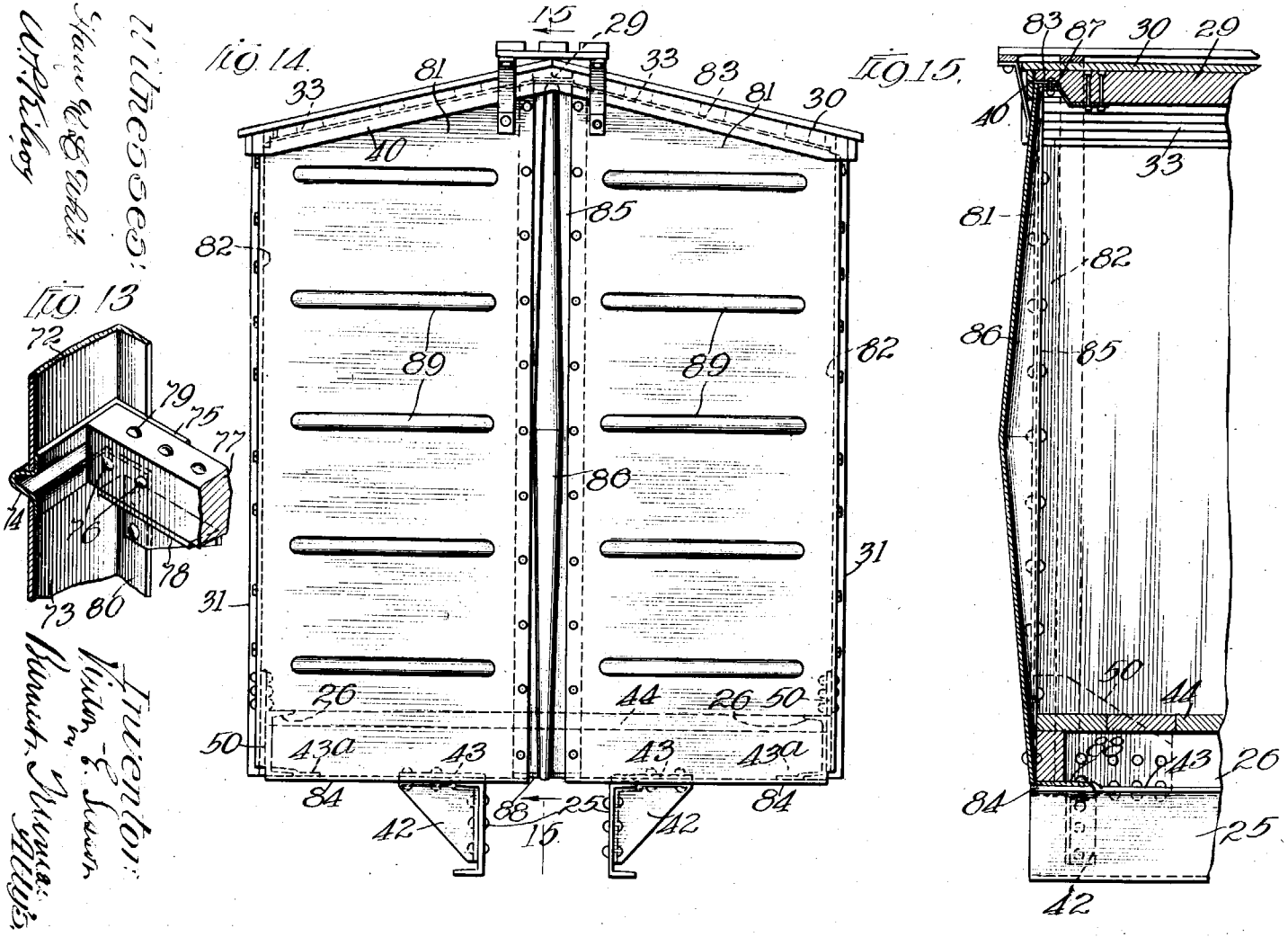
Witnesses:
Harry E. White
W. P. Kilroy
Inventor:
Victor E. Sisson
by Barnett, Trumar & Ally's.

UNITED STATES PATENT OFFICE.

VINTON E. SISSON, OF CHICAGO, ILLINOIS, ASSIGNOR TO WALTER P. MURPHY, OF CHICAGO, ILLINOIS.

METAL END FOR RAILWAY-CARS.

14,434. Specification of Reissued Letters Patent. Reissued Feb. 19, 1918.

Original No. 1,244,907, dated October 30, 1917, Serial No. 665,098, filed December 11, 1911. Application for reissue filed January 17, 1918. Serial No. 212,356.

*To all whom it may concern:*

Be it known that I, VINTON E. SISSON, a citizen of the United States, and a resident of Chicago, in the county of Cook and State of Illinois, have made certain new and useful Improvements in Metal Ends for Railway-Cars, of which the following is a specification.

My invention relates to a metal end structure for railway cars, particularly for box or house cars, and the invention has for one of its primary objects to provide a novel and improved all metal car end, of sectional construction, which will be very strong so as to withstand the heavy strains to which railway freight cars are subjected and which, furthermore, will be perfectly waterproof in all its joints.

A further object is to provide a metal end structure in which the end sheets have corrugations which run vertically, this arrangement of the corrugations, besides having the other advantages hereinafter described, permitting the end sheets to be pierced, if desired, with one or more door openings without materially lessening the capacity of the structure to resist the pressure and thrust of the cargo when the car is started and stopped.

A further object of the invention is to provide an all metal car end which is so formed and constructed as to do away with either the usual end sill or the usual corner posts, or both, or at least make it possible to have these elements of the car frame much smaller and lighter than is customary.

The invention has for a further object to provide means for effectively securing together the end sheets, which means serves the function also of strengthening and rigidifying the end structure; the preferred form of the invention, having regard to this feature, contemplating the use of a connecting element for the end sheets having one or more corrugations running transversely to the corrugations of the sheets.

A further object of the invention is to provide an end structure, the elements of which are firmly secured to the longitudinal members of the car frame, the side and draft sills, side girths, side plates and ridge pole, so that the strains on the end structure will be transmitted to these relatively strong rigid elements of the car.

The invention has for further objects the several other novel devices, arrangements and constructions in and relating to car ends which will be hereinafter described and claimed.

The invention is illustrated, in certain preferred embodiments, in the accompanying drawings, wherein—

Figure 1:
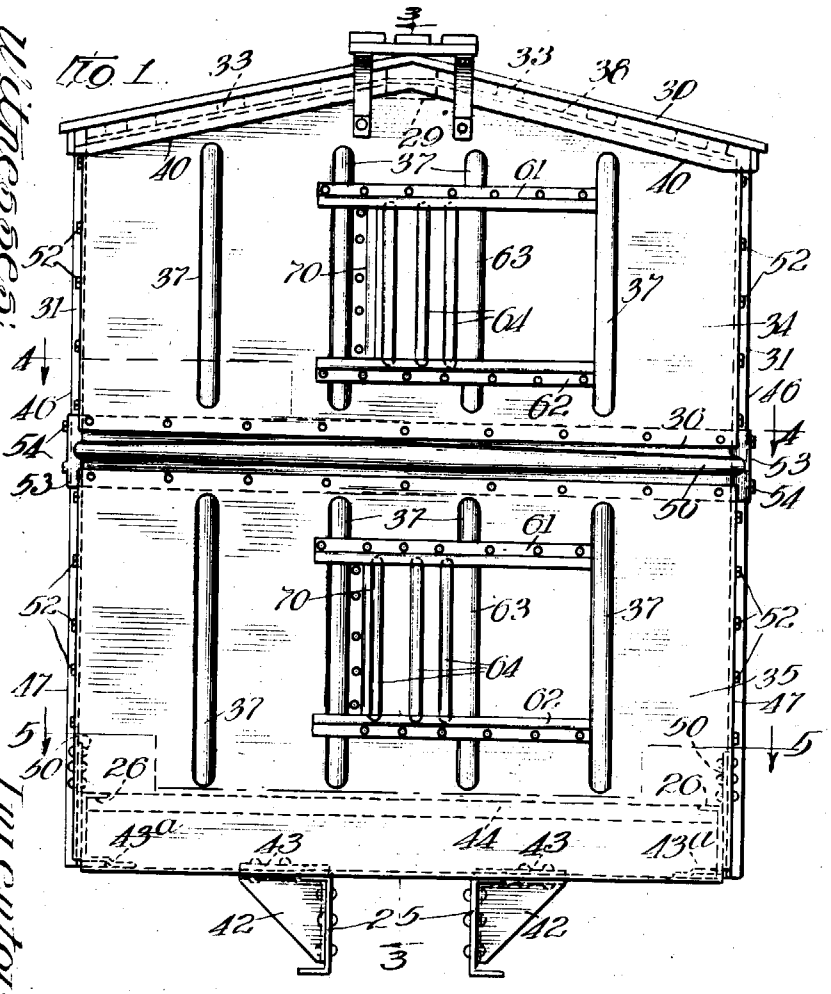

Figure 1 is an end elevation of a railway box car fitted with the metal end of my invention;

Fig. 2, a fragmentary side elevation of the same;

Fig. 3, a sectional view taken on line 3—3 of Fig. 1, looking in the direction of the arrows;

Fig. 4, a broken sectional plan taken on line 4—4 of Fig. 1, the scale of this figure being enlarged;

Fig. 5, a sectional plan on line 5—5 of Fig. 1, part of the flooring being broken away, and other portions of the structure being omitted in order to illustrate more clearly certain other features.

Fig. 6, a fragmentary elevation of an upper corner of the frame of the car showing the attachment of the end thereto, the car in this case being a steel frame car;

Fig. 7, a similar view illustrating the construction when the frame of the car is wood;

Fig. 8, a fragmentary end elevation of the parts shown in Fig. 7;

Fig. 9, a fragmentary elevation with parts in section showing the construction and arrangement of the end door;

Fig. 10, a sectional plan taken on line 10—10 of Fig. 9;

Fig. 11, a sectional view taken on line 11—11 of Fig. 9, looking in the direction of the arrows;

Fig. 12, a view, in perspective, of a keeper plate for one of the door rollers;

Fig. 13, a fragmentary view, in perspective, illustrating a construction suitable particularly for stock cars, and the like;

Fig. 14, an end elevation of a modified construction in which the end structure is divided vertically into sections, and Fig. 15, a sectional view taken on line 15—15 of Fig. 14, looking in the direction of the arrows.

Like characters of reference indicate like parts in the several figures of the drawings.

Referring to the drawings, and particularly to Figs. 1 to 6 inclusive, 25 designates the draft sills of the car, 26 the side sills, 27 the side girths, 28 the side plates, 29 the ridge pole, 30 the roof sheets, 31 the outer sheathing, 32 the lining, and 33 the purlins of the car.

In the embodiment of my invention shown in these figures the end structure consists of an upper metal end sheet 34, a lower metal end sheet 35 and a connecting element or band 36 to which the edges of the end sheets are secured and which, so far as concerns rigidity and strength to the end structure, performs the function of the ordinary end girth. The end sheets are formed with vertical, or substantially upright, preferably inwardly extending ribs or corrugations 37; the corrugations in the lower sheet being preferably tapered as shown so that their cross sectional area is greatest in the lower part of the sheet, the portion of the car end against which the cargo thrusts are most severe and which, therefore, requires a maximum reinforcement.

The upper end sheet 34 is formed on its upper edge with an inturned flange 38 which supports the ends of the ridge pole and purlins. Preferably a strap 39 is riveted to the flange 38 and bolted (Figs. 3 and 6) to the ridge pole. A fascia plate 40 overlapped by the roof sheets covers the spaces intervening between the ridge pole and the purlins. This construction, it will be noted, does away with the usual end plate of the frame. The flange 38 is preferably formed by bending over the upper edge of the sheet on lines corresponding to the slope of the car roof which gives the flange greater width at the sides of the car than at the middle; but this feature is not claimed generically herein being made the subject matter of a co-pending application Serial No. 714,701, filed August 12, 1912 (patented September 2, 1913, as Patent No. 1,071,813).

The lower end sheet 35 is formed with an inturned flange 41 which is secured to the draft sills 25 by the castings 42 and gussets 43 and to the side sills 26 by the gussets 43[a]. The flange 41 takes the place of the usual ends sills. It transmits strains on the end structure directly to the side and draft sills of the car. The floor 44 is laid on a nailing strip 45 which has the location of the usual end sill, but which does not perform the function of an end sill, serving merely as a support for the flooring. It will be seen that the corrugations 37 terminate within the upper and lower edges of the end sheets. Therefore there is a flat strip of metal at each end of each sheet which resists the tendency which the end structure will have to deflect in case it receives a heavy pressure or thrust from the cargo, for example. If the corrugations extended to the edges of the sheets a strong pressure against the sheets would tend to expand the sheets by straightening out the corrugations. The flat margins above and below the ends of the corrugations resist this tendency. The metal itself has to stretch before the sheets can be deflected. The flange 41 on the lower edge of the lower sheet also serves an important function in strengthening and rigidifying the structure. With the corrugations running vertically of the sheet an impact of considerable force against the lower part of the sheet, for example, the impact of a pile of rails or pipe, due to inertia when the train starts or stops, will tend to bend the sheet along the line of the corrugations. This is checked by the flange 41 which must bend across its width before the sheet can be bent.

Both upper and lower end sheets are formed on their vertical edges with the flanges 46 and 47 respectively. The flanges 46 on the opposite edges of the upper end sheet are secured to the side plates 28 by means of gussets 48 (Fig. 6), the diagonal braces 49 being attached to the same gussets. The flanges 47 of the lower end sheet are secured by means of gussets 50 to the side sills 26. This construction which anchors the vertical edges of the end sheets to longitudinally extending members of the car frame does away with the necessity of corner posts so far as strength and rigidity are concerned. In these figures I have shown filler strips 51 which are in the place of the usual corner posts, the specific purpose of which is to provide a secure and waterproof joint between the end structure and the side sheathing of the car. The members 51 may, if desired, carry some of the load so as to perform in a sense the function of corner posts. These filler strips are gained out at one corner to receive the sheathing 31 of the car and at the adjacent corner to receive the vertical flanges of the end sheets which are secured thereto by the bolts 52.

The connecting member or end girth 36 is preferably formed with flanges 53 which fit into the recess of the filler strips 51 and overlap the sheathing of the car (Fig. 4). Bolts 54 secure the flanges 53 to the side girths 27 of the car passing through the lining 32 and through angular straps 55 which are riveted to the end girth member and the end sheets. The end girth is preferably formed with a strengthening or rigidifying member. In the pressed steel girth shown the rigidifying member may consist of an outstanding corrugation 56 which, furthermore, by standing above the upper edge of end sheet 35, prevents water from working into the joint between the sheet and the girth. The ends of the corrugation 56 are preferably carried around the corners of the girth as best shown in Fig. 4, the recessing of the filler strips 51 being deep enough so that the corrugations do not project beyond the sheathing of the car.

It will be seen that the connecting element 36 which connects the end sheets is anchored at opposite ends to the side girths so that strains on the end sheets which are transmitted to this connecting member, which is in effect an end girth, are further transmitted to the heavy longitudinally extending side girths of the car. The corrugation 56 of the end girth runs at right angles to the corrugations 37 of the end sheets so that the end structure is reinforced by corrugations running both ways. Obviously, if the car had two side girths on a side instead of the usual one, the construction of the end could be modified so as to provide three end plates and two connecting members or end girths. By carrying the ends of the corrugation 56 around on the flanges 53 the tendency of the car to weave, that is, for one corner to advance more than the other, is checked since the corrugation at the angles of the girth effectually prevent it from bending at these places.

In Figs. 7 and 8 I have shown suitable means for securing the upper end sheet to a wooden side plate. 28[a] designates the side plate. 57 is a casting riveted to the end sheet 34 and its flange 46, this casting supporting the side plate which is preferably secured thereto by the bolts 58. Bolts 59 secure the side plate to the flange 46.

In Figs. 10 to 12 inclusive, is illustrated an all metal door construction suitable for use when the end structure, as hereinabove described, is provided with one or more doors. It will be understood that while the figures show two end doors, one at each end sheet, a single door might be provided or the door feature omitted entirely. In the drawings, 60 designates a door opening, 61 and 62 Z-bars riveted to the end sheet above and below the door opening, and 63 a door consisting preferably of a single sheet of metal provided with the outwardly projecting vertical corrugations 64 and with the upper and lower flanges 65 and 66 which latter bear against the angle guides 61, 62. The lower flange 66 of the door is formed with slots through which extend rollers 67, the axles 68 of which are kept in place by slotted keeper plates 69. At the forward and rear edges of the door opening are closure strips 70, 71, the rear edge of the door having the inturned flange 72 which engages the closure strip 71 (Fig. 10). The Z-bars 61, 62 not only serve as guides for the door but also reinforce and strengthen the end sheet in compensation for the weakening produced by piercing it with the door opening, the Z-bars running at right angles to the corrugations 37 of the end sheet. The corrugations of the door preferably run at right angles to the flanges 65 and 66 so that the door is reinforced both vertically and horizontally. Pressure on the door from within is transmitted by the flanges to the Z-bar guides 61, 62 so that no strain is put on the rollers.

In Fig. 13 I have illustrated a construction suitable for a stock car in which, there being no sheathing as in the ordinary box car, the filler strips 51 of the previously described constructions may be omitted. 72 and 73 designate the upper and lower end sheets and 74 the connecting member or end girth. The flange 75 of the latter overlaps and is secured by means of bolts 76 directly to the side girth 77. The end of the latter rests on a bracket 78 and is secured thereto by bolts 79, the bracket being riveted to the flange 80 of the end sheet 73.

In Figs. 14 and 15 I have shown a sectional end divided vertically instead of horizontally. 81, 81 designate two end sheets having flanges 82 on their vertical edges secured to the sides of the car in the manner shown in the first six figures of the drawings. The sheets 81, 81 are preferably formed at their upper edges with the flanges 83 upon which the purlins are supported and likewise flanges 84 at their lower edges, which latter are secured to side sills and draft sills in the manner described in the description of the previous construction. The sheets 81 are connected by the vertical connecting member 85 formed with a corrugation 86 and with a flange 87 anchored to the ridge pole 29 and a flange 88 riveted to the flanges 84 on the end sheets. The end sheets are preferably provided with horizontal corrugations 89. The embodiment of the invention just described is not specifically claimed herein as it is made the subject of a co-pending application filed by applicant June 17, 1912, Serial No. 704,110.

I have shown my invention as embodied in a preferred construction of car end and have indicated certain modifications thereof, but as it will be readily understood that other modifications might be devised which would come within the scope of my invention I do not limit myself to the particulars shown and described except so far as the same are made limitations in certain of the claims herein, my purpose being to claim both broadly and narrowly whatever patentable features my invention may possess in view of the state of the prior art.

I claim:

1. A metal end structure for railway cars comprising metal end sheets and a reinforcing and connecting band to which the end sheets are secured, and means for anchoring the opposite ends of said band to longitudinally extending members of the car frame, said end sheets being formed with corrugations disposed transversely to the reinforcing band.

2. A metal end structure for railway cars comprising metal end sheets and a reinforcing or connecting band to which the end sheets are secured, and means for anchoring the opposite ends of said band to longitudinally extending members of the car frame; said band being formed with a rigidifying member running lengthwise thereof and the sheets with corrugations transverse thereto.

3. A metal end structure for railway cars comprising metal end sheets arranged one above the other and extending from side to side of the car, a reinforcing and connecting band to which the end sheets are secured, and means for anchoring the opposite ends of said band to the car frame, said band being formed with a horizontal corrugation and said end sheets with vertical corrugations.

4. A metal end structure for railway cars comprising metal end sheets arranged one above the other and extending from side to side of the car, a metal end girth having a longitudinal rib, the edges of the end sheets being secured to said girth on opposite sides of said rib, and means for anchoring the opposite extremities of the end girth to the side girths of the car.

5. A metal end structure for railway cars comprising metal end sheets formed with vertical corrugations, arranged one above the other and extending from side to side of the car, a metal end girth having a longitudinal rib the edges of the end sheets being secured to said girth on opposite sides of said rib and means for anchoring the opposite extremities of the end girth to the side girths of the car.

6. A metal end structure for railway cars comprising metal end sheets arranged one above the other and extending from side to side of the car, a metal end girth to which the edges of the end sheets are secured, and means for anchoring the opposite extremities of the end girth to the side girths of the car; said end sheets being formed with corrugations and the end girth with a horizontal corrugation.

7. A metal end structure for railway cars comprising metal end sheets formed with vertical corrugations, extending from side to side of the car, and provided with flanges at their vertical edges which overlap the sides of the car, a metal end girth formed with a horizontal corrugation to which the edges of the end sheets are attached, flanges at the opposite extremities of said end girth, and means for securing said flanges to the side girths of the car, the corrugation of the end girth extending around upon the flanges thereof.

8. The combination with a box car having the usual wood sheathing at the sides, of a metal end structure for the same comprising metal end sheets having angularly disposed flanges on their vertical edges, means for securing said flanges to the side sills and side plates of the car, wood filler strips disposed in the corners formed by said flanges to which said flanges are secured and which are overlapped by said sheathing.

9. In a metal end structure for railway cars, the combination with upper and lower metal end sheets, said sheets being formed with flanges secured directly to the side sills and side plates of the car, the upper sheet being formed with a flange which supports the ridge pole and purlins of the car, the lower sheet being formed with a flange which is secured directly to the longitudinal members of the end frame of the car, and means for connecting said end sheets one to another.

10. In a metal end structure for railway cars, the combination with upper and lower metal end sheets, said sheets being formed with flanges secured directly to the side sills and side plates of the car, the upper sheet being formed with a flange which supports the ridge pole and purlins of the car, the lower sheet being formed with a flange which is secured directly to the longitudinal members of the end frame of the car, and a metal end girth to which the end sheets are attached and which is secured to the side girths of the car.

11. In a metal end structure for railway cars, the combination with upper and lower metal end sheets, said sheets being formed with flanges secured directly to the side sills and side plates of the car, the upper sheet being formed with a flange which supports the ridge pole and purlins of the car, the lower sheet being formed with a flange which is secured directly to the longitudinal members of the end frame of the car, and a metal end girth to which the end sheets are attached and which is secured to the side girths of the car, the end sheets being formed with inwardly projecting vertical corrugations and the end girth with an outwardly extending horizontal corrugation.

12. A metal end structure for railway cars comprising a metal end sheet formed with an inturned flange and means for securing said flange directly to the longitudinal members of the frame of the car so that said flange performs the function of the usual end sill.

13. A metal end structure for railway cars comprising metal end sheets extending from one side of the car to the other and arranged one above the other, and a reinforcing and connecting band to which the adjacent edges of said sheets are secured, the band being formed with a rib extending lengthwise thereof and the sheets with ribs running at right angles to the rib on said band.

14. The combination with wooden structures forming the sides of a railway car, of a metal end structure consisting of end plates and an end girth, said plates and girth being formed with flanges overlapping and secured to the sides of the car, and the sides of the car being recessed to receive said flanges, substantially as and for the purpose described.

15. The combination with wooden structures forming the sides of a railway car, of a metal end structure consisting of end plates and an end girth, said plates and girth being formed with flanges overlapping and secured to the sides of the car, the sides of the car being recessed to receive said flanges, and the end girth being formed with a rigidifying member which extends around the corners formed by the flanges of said girth.

16. A metal end structure for railway cars comprising metal end sheets extending from side to side of the car and arranged one above the other, and a reinforcing and connecting band to which the adjacent edges of said sheets are secured, said sheets being formed with vertical corrugations which terminate within the margins thereof.

17. A sheet metal end structure for a railway car provided with means for attaching it to the end frame of the car, formed with upper and lower sets of vertical corrugations, and comprising a girth member extending horizontally across said end structure between said upper and lower sets of corrugations and formed with a longitudinal pressed out rib.

18. A sheet metal end structure for a railway car formed with angular flanges for attachment to the end frame of the car, and with two sets of corrugations and comprising a reinforcing band which extends across said end structure between said sets of corrugations transversely thereto and is formed with a pressed out longitudinal rib and with angular flanges for attachment to the end frame of the car.

19. A sheet metal end structure for a railway car formed with angular flanges for attachment to the end frame of the car and with upper and lower sets of vertical corrugations, and comprising a girth member extending horizontally across said end structure between said upper and lower sets of corrugations and formed with a longitudinally pressed out rib and with angular flanges for attachment to the end frame of said car.

20. As a new article of manufacture, a car end comprising a comparatively wide upper section, having a series of comparatively short stiffening ribs or corrugations, a comparatively wide lower section having a series of comparatively short stiffening ribs or corrugations, and a comparatively narrow intermediate section uniting the adjacent edges of the upper and lower sections, and which intermediate section is provided with a single long stiffening rib or corrugation, the same being arranged substantially at right angles to the ribs or corrugations of the wide section.

21. A car end comprising a lower section having a series of substantially upright stiffening ribs or corrugations, an upper section having a series of substantially upright ribs or corrugations, and an intermediate section uniting said upper and lower sections.

22. A car end comprising a lower section having a series of substantially upright stiffening ribs or corrugations, an upper section having a series of substantially upright ribs or corrugations, and an intermediate section uniting said upper and lower sections, which intermediate section is provided with a horizontally disposed stiffening rib or corrugation.

23. A car end composed of a series of sections of sheet metal, the lines of separation between said sections being horizontally disposed, each section being provided with a stiffening rib or corrugation and the intermediate section being comparatively narrow and positioned so that its reinforcing rib or corrugation is arranged substantially at right angles to the ribs or corrugations of the other sections.

24. A car end constructed of sheet metal having a centrally arranged, horizontally disposed stiffening rib or corrugation, and the sections of material above and below said centrally disposed rib having stiffening ribs or corrugations pressed therein, which last mentioned stiffening ribs or corrugations are arranged substantially at right angles to the first mentioned rib or corrugation.

25. A car end constructed of sheet metal and having a centrally arranged, horizontally disposed stiffening rib or corrugation which extends practically the entire width of the car end, and a series of comparatively short vertically disposed stiffening ribs or corrugations formed in the material of which the car end is formed above and below said horizontally disposed rib or corrugation.

26. A sheet metal end structure for a railway box car, comprising an upper sheet, a lower sheet provided with vertical stiffening and reinforcing corrugations, and a transversely extending channeled girth member secured to the upper and lower sheets at their adjacent edges.

27. A sheet metal end structure for a railway box car, comprising an upper sheet, a lower sheet provided with vertical stiffening and reinforcing corrugations which are tapered, the greatest cross sectional area being in the lower portion of the sheet, and a transversely extending channeled girth member secured to the upper and lower sheets at their adjacent edges.

28. A sheet metal end structure for a railway box car, comprising an upper sheet, a lower sheet provided with vertical stiffening and reinforcing corrugations, and a transversely extending channeled girth member secured to the upper and lower sheets at their adjacent edges, the lower sheet being provided with an inturned flange at its bottom edge which extends under the flooring of the car.

29. A sheet metal end structure for a railway box car, comprising an upper sheet, a lower sheet provided with vertical stiffening and reinforcing corrugations, and a transversely extending channeled girth member secured to the upper and lower sheets at their adjacent edges, the upper sheet being provided with an inturned flange to support the roof of the car.

30. The combination with the end framing of a railway car, of a sheet metal end for the car comprising a vertically corrugated metal sheet secured to the end framing, the corrugations of which are tapered, the greatest cross sectional area being in the lower portion of the sheet and above the floor of the car.

31. The combination with the end framing of a railway car, of a sheet metal end for the car comprising a vertically corrugated metal sheet secured to the end framing, and a transverse reinforcing member at the upper edge of said sheet with its extremities anchored to the framing of the car.

32. The combination with the end framing of a railway car, of a sheet metal end for the car comprising a vertically corrugated metal sheet secured to the end framing, and a channeled reinforcing member extending across the end of the car and attached to the upper edge of said sheet.

33. The combination with the end framing of a railway car, of a sheet metal end for the car comprising a vertically corrugated metal sheet secured to the end framing, and a channeled reinforcing member extending across the end of the car and attached to the upper edge of said sheet, the lower edge of the sheet being provided with an angular reinforcing and stiffening flange secured to the under frame of the car.

34. The combination with the end framing of a railway car, of a sheet metal end for the car comprising a vertically corrugated metal sheet secured to the end framing, the corrugations of which are tapered, the greatest cross sectional area being in the lower portion of the sheet and above the floor of the car, and a transversely extending channeled reinforcing member secured to the upper edge of the sheet, the lower edge of the sheet being provided with an angular flange secured to the under frame of the car.

35. In a railway box car, the combination with the framing of the car and the longitudinal sustaining members of the car roof; of a sheet metal end structure formed with vertical corrugations and attached to said car framing, said structure being provided at its lower edge with a horizontal stiffening flange secured to the framing of the car and at the top with a stiffening flange which additionally provides a support for the longitudinal sustaining members of the roof.

36. A sheet metal end structure for a railway car comprising an upper sheet, a lower sheet provided with vertical corrugations, and a girth member secured to the upper and lower sheets at their adjacent edges and formed to provide a rigidifying reinforcement extending transversely of said vertical corrugations.

37. In a railway box car, the combination with the roof structure and side walls of the car, of a sheet metal end wall formed with vertical corrugations and provided at its upper edge with means forming a transverse reinforcement to rigidify said end wall at the top and support the roof structure, and means for anchoring said rigidifying reinforcement to the side walls of the car.

38. In a railway box car, the combination with the roof and side walls of the car, of a sheet metal end wall formed with vertical corrugations and provided at its upper edge with a structure narrower at the center longitudinal line of the car roof, wider at the sides of the car, and anchored to the side walls of the car so as to form bracing elements between the sheet metal end wall of the car and the side walls thereof.

39. In a railway box car, the combination with the longitudinal frame members and the roof of a car, of a sheet metal end structure comprising an end sheet formed with vertical corrugations, and means providing transverse reinforcements at the upper and lower edges of the sheet for transmitting the stresses on the corrugations to the longitudinal frame members of the car, the upper reinforcement providing also a support for the roof of the car.

40. In a railway car, the combination with the side walls and draft sills of a car, of a sheet metal end structure comprising an end sheet formed with vertical corrugations and provided with a transverse reinforcing and rigidifying element at its lower edge and means for securing said element to the side sills and draft sills so that the stresses on the corrugations are transmitted to said sills.

41. In a railway box car, the combination with the longitudinal frame members of the car, of a sheet metal end wall comprising a plurality of end sheets, means constituting a reinforcing element having a rigidifying rib at the meeting edges of adjacent end sheets, the terminal portions of said reinforcing element being anchored to certain of said longitudinal frame members so as to form a rigid structure therewith, and means for anchoring the upper and lower corners of the sheets to others of said frame members; said end sheets being formed with corrugations disposed so as to prevent the buckling of the sheets.

42. In a railway box car, the combination with the longitudinal frame members of the car, of a sheet metal end wall comprising a plurality of end sheets, means constituting a reinforcing element having a rigidifying rib at the meeting edges of adjacent end sheets, the terminal portions of said reinforcing element being anchored to certain of said longitudinal frame members so as to form a rigid structure therewith, and means for anchoring the upper and lower corners of the sheets to other of said frame members; said end sheets being formed with corrugations disposed so as to prevent the buckling of the sheets, and with angularly disposed flanges which provide in part the means for attaching said sheets to said frame members.

43. In a railway box car, the combination with the longitudinal frame members of the car, of a sheet metal end wall structure and means for anchoring said sheet metal structure at its corners to said longitudinal frame members, said sheets being formed with rigidifying corrugations and with angular flanges, the latter being attached to certain of said longitudinal frame members so that they serve to provide rigid connections between the frame members which they connect and also to stiffen the edges of said sheet metal structure.

44. The combination with the framing of a railway box car, of a sheet metal end structure for the car comprising upper and lower sheets formed with rigidifying corrugations and a girth member formed with a rigidifying rib extending longitudinally of the same, said girth member being anchored at opposite ends to the car frame and uniting said upper and lower sheets.

VINTON E. SISSON.